United States Patent
Dai et al.

(10) Patent No.: US 9,923,204 B2
(45) Date of Patent: Mar. 20, 2018

(54) METHOD FOR MAKING CATHODE ACTIVE MATERIAL OF LITHIUM ION BATTERY

(71) Applicants: JIANGSU HUADONG INSTITUTE OF LI-ION BATTERY CO., LTD., Suzhou, Jiangsu (CN); TSINGHUA UNIVERSITY, Beijing (CN)

(72) Inventors: Zhong-Jia Dai, Beijing (CN); Xiang-Ming He, Beijing (CN); Li Wang, Beijing (CN); Jian-Jun Li, Beijing (CN); Yu-Ming Shang, Beijing (CN); Jian Gao, Beijing (CN); Yao-Wu Wang, Beijing (CN)

(73) Assignees: Jiangsu Huadong Institute of Li-ion Battery Co. Ltd., Suzhou (CN); Tsinghua University, Beijing (CN)

( * ) Notice: Subject to any disclaimer, the term of this patent is extended or adjusted under 35 U.S.C. 154(b) by 0 days.

(21) Appl. No.: 15/243,723

(22) Filed: Aug. 22, 2016

(65) Prior Publication Data
US 2017/0040611 A1    Feb. 9, 2017

Related U.S. Application Data

(63) Continuation of application No. PCT/CN2015/071319, filed on Jan. 22, 2015.

(30) Foreign Application Priority Data

Feb. 26, 2014  (CN) .......................... 2014 1 0066488

(51) Int. Cl.
| | | |
|---|---|---|
| *H01B 1/08* | (2006.01) | |
| *H01M 4/58* | (2010.01) | |
| *C01B 25/45* | (2006.01) | |
| *H01M 4/36* | (2006.01) | |
| *H01M 10/0525* | (2010.01) | |

(Continued)

(52) U.S. Cl.
CPC .......... *H01M 4/5825* (2013.01); *C01B 25/45* (2013.01); *H01B 1/08* (2013.01); *H01M 4/364* (2013.01);
(Continued)

(58) Field of Classification Search
CPC . C01B 25/45; H01M 10/052; H01M 10/0525; H01M 2004/028; H01M 4/136;
(Continued)

(56) References Cited

U.S. PATENT DOCUMENTS

2006/0222946 A1   10/2006   Okada et al.
2011/0195304 A1   8/2011    Abe et al.
(Continued)

FOREIGN PATENT DOCUMENTS

CN    101284658 A    10/2008
CN    101288197 A    10/2008
(Continued)

OTHER PUBLICATIONS

International Search Report and Written Opinion on corresponding PCT application (PCT/CN2015/071319) from International Searching Authority (CN) dated Sep. 3, 2015.

*Primary Examiner* — Mark Kopec
*Assistant Examiner* — Jaison P Thomas

(57) ABSTRACT

A method for making a cathode active material of a lithium ion battery is disclosed. In the method, $LiMPO_4$ particles and $LiNPO_4$ particles are provided. The $LiMPO_4$ particles and $LiNPO_4$ particles both are olivine type crystals belonged to a pnma space group of an orthorhombic crystal system, wherein M represents Fe, Mn, Co, or Ni, N represents a metal element having a +2 valence, and N is different from M. The $LiMPO_4$ particles and the $LiNPO_4$ particles are mixed together to form a precursor. The precursor is calcined to form $LiM_xN_{1-x}PO_4$ particles, wherein $0<x<1$.

16 Claims, 8 Drawing Sheets

---

Providing $LiMPO_4$ particles and $LiNPO_4$ particles both being olivine type crystals belonged to a pnma space group of an orthorhombic crystal system, wherein M represents Fe, Mn, Co, or Ni, N represents a metal element having a +2 valence, and N is different from M — S1 mixing the $LiMPO_4$ particles and the $LiNPO_4$ particles together to form a precursor — S2 calcining the precursor to form $LiM_xN_{1-x}PO_4$ particles, wherein $0<x<1$ — S3

(51) Int. Cl.
*H01M 10/052* (2010.01)
*H01M 4/136* (2010.01)
*H01M 4/02* (2006.01)

(52) U.S. Cl.
CPC ..... *H01M 10/052* (2013.01); *H01M 10/0525* (2013.01); *C01P 2006/40* (2013.01); *H01M 4/136* (2013.01); *H01M 2004/028* (2013.01)

(58) Field of Classification Search
CPC . H01M 4/364; H01M 4/5825; C01P 2006/40; H01B 1/08
See application file for complete search history.

(56) References Cited

U.S. PATENT DOCUMENTS

2012/0237833 A1  9/2012  Guerfi et al.
2014/0295277 A1* 10/2014  Yoshida .................. C01B 25/45
                                                       429/221

FOREIGN PATENT DOCUMENTS

| CN | 101740751 A | 6/2010 |
| CN | 102186770 A | 9/2011 |
| CN | 102244263 A | 11/2011 |
| CN | 103545515 A | 1/2014 |
| CN | 103904301 A * | 7/2014 .......... H01M 4/5825 |
| CN | 103904301 A | 7/2014 |
| WO | WO2006071972 | 7/2006 |
| WO | WO2011032264 | 3/2011 |

* cited by examiner

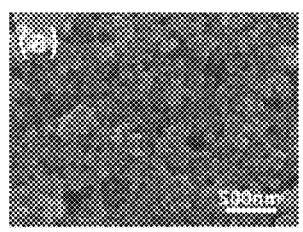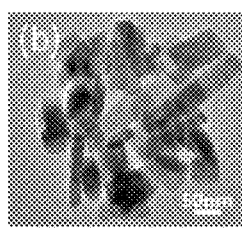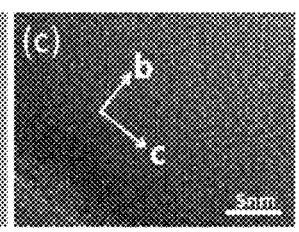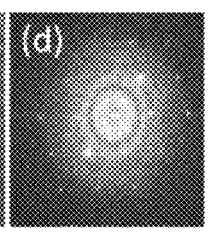
FIG. 4A  FIG. 4B  FIG. 4C  FIG. 4D
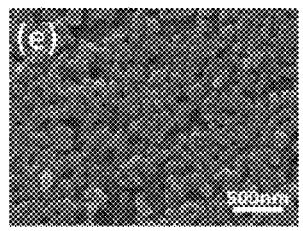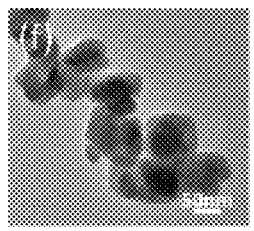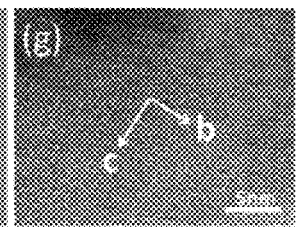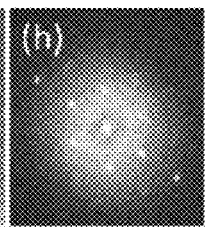
FIG. 4E  FIG. 4F  FIG. 4G  FIG. 4H
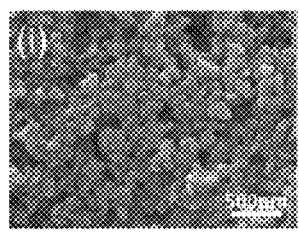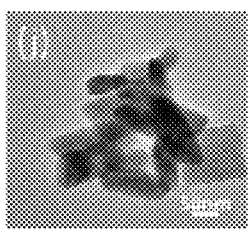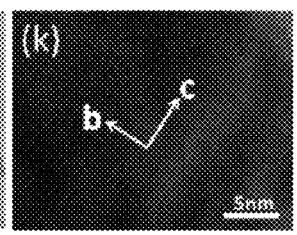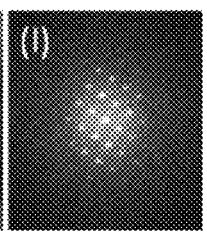
FIG. 4I  FIG. 4J  FIG. 4K  FIG. 4L

METHOD FOR MAKING CATHODE ACTIVE MATERIAL OF LITHIUM ION BATTERY

CROSS-REFERENCE TO RELATED APPLICATIONS

This application claims all benefits accruing under 35 U.S.C. § 119 from China Patent Application No. 201410066488.8, filed on Feb. 26, 2014 in the China Intellectual Property Office, the content of which is hereby incorporated by reference. This application is a continuation under 35 U.S.C. § 120 of international patent application PCT/CN2015/071319 filed Jan. 22, 2015.

FIELD

The present disclosure relates to methods for making cathode active materials of lithium ion batteries, and particular relates to a method for making a doped transition metal phosphate $LiM_xN_{1-x}PO_4$ as the cathode active material.

BACKGROUND

Olivine structure lithium metal phosphates $LiMPO_4$ are cathode active materials in lithium ion batteries, with advantages including low-cost, environmental friendliness, high abundance, stable chemical properties, and excellent safety. One lithium metal phosphate is lithium iron phosphate ($LiFePO_4$), which has a theoretical capacity of 170 mAh/g and superior cycling capability. However, $LiFePO_4$ has a voltage plateau of 3.4 V, which is a severe restriction of energy density of the lithium ion battery. $LiMnPO_4$, $LiCoPO_4$, and $LiNiPO_4$ have better energy density, but have relatively low electronic conductivities and lithium ion diffusion rates restricting the applications thereof. A solution for this problem is doping the lithium metal phosphates to form $LiM_xN_{1-x}PO_4$ (e.g., $LiMn_xFe_{1-x}PO_4$ or $LiMn_xMg_{1-x}PO_4$).

Solvothermal synthesis and solid phase synthesis are two methods for synthesizing the doped lithium metal phosphates $LiM_xN_{1-x}PO_4$. The solvothermal synthesis includes dissolving reactants in an organic solvent and solvothermal heating the solution in an autoclave to obtain the doped lithium metal phosphate. The solid phase synthesis includes ball milling a mixture of the reactants with a solvent, and calcining the milled mixture in an inert gas at a relatively high temperature to obtain the doped lithium metal phosphate.

BRIEF DESCRIPTION OF THE DRAWINGS

Implementations are described by way of example only with reference to the attached figures.

FIG. 4A to FIG. 4D illustrate one embodiment of $LiMnPO_4$ particles, wherein FIG. 4A and FIG. 4B are SEM images at different resolutions, FIG. 4C is a transmission electron microscope (TEM) image, and FIG. 4D is a Fourier transform (FT) image of the TEM image.

FIG. 4E to FIG. 4H illustrate one embodiment of $LiMn_{0.4}Fe_{0.6}PO_4/C$ particles, wherein FIG. 4E and FIG. 4F are SEM images at different resolutions, FIG. 4G is a TEM image, and FIG. 4H is a FT image of the TEM image.

FIG. 4I to FIG. 4L illustrate one embodiment of $LiFePO_4$ particles, wherein FIG. 4I and FIG. 4J are SEM images at different resolutions, FIG. 4K is a TEM image, and FIG. 4L is a FT image of the TEM image.

DETAILED DESCRIPTION

Figure 1:
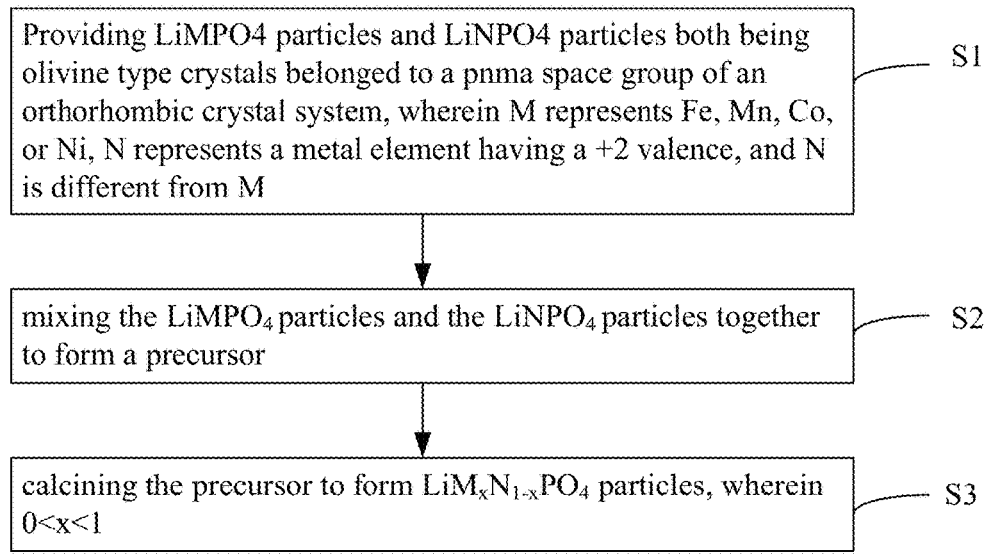
FIG. 1 is a flow chart of an embodiment of a method for making a cathode active material of a lithium ion battery.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Referring to FIG. 1, one embodiment of a method for making a cathode active material of a lithium ion battery comprises steps of:

S1, providing $LiMPO_4$ particles and $LiNPO_4$ particles both being olivine type crystals belonging to a pnma space group of an orthorhombic crystal system, wherein M represents Fe, Mn, Co, or Ni, N represents a metal element having a +2 valence, and N is different from M;

S2, mixing the $LiMPO_4$ particles and the $LiNPO_4$ particles together to form a precursor; and S3, calcining the precursor to form $LiM_xN_{1-x}PO_4$ particles, wherein 0<x<1.

In step S1, the $LiMPO_4$ particles and the $LiNPO_4$ particles have the same crystal structure, which is an olivine type crystal structure belonging to a pnma space group of an orthorhombic crystal system. In one embodiment, N can be one of Fe, Mn, Co, Ni, Mg, Ca, Zn, Cu, Al, B, Cr, Nb, Sc, Ti, V, Be, Sr, Ba, Zr, and La.

A shape of the $LiMPO_4$ particles and the $LiNPO_4$ particles can be at least one of spheres, rods, and sheets. In one embodiment, the $LiMPO_4$ particles and the $LiNPO_4$ particles are sheet shaped with which a relatively large contact surface area that is convenient for diffusion of the elements M and N during the calcining in step S4 can be formed between the particles. The LiMPO$_4$ particles and the LiNPO$_4$ particles can be nanosized, have a relatively high reacting activity, and can be more adaptable to promote a solid phase reaction during the calcining. In one embodiment, both the LiMPO$_4$ particles and the LiNPO$_4$ particles are nanosheets.

The LiMPO$_4$ particles and the LiNPO$_4$ particles can have the same or different morphologies. When the LiMPO$_4$ particles and the LiNPO$_4$ particles have the same morphology, they can have the same or different sizes. When both the LiMPO$_4$ particles and the LiNPO$_4$ particles are crystals with the same crystal structure, the only difference between the LiMPO$_4$ particles and the LiNPO$_4$ particles may be the difference in amount per unit volume (i.e., the molar concentration) of Fe and Mn. Therefore, during the calcining in step S4, only diffusion may occur between elements M and N in the LiMPO$_4$ particles and the LiNPO$_4$ particles, and the morphology, crystal structure, and size of the LiMPO$_4$ particles and the LiNPO$_4$ particles are maintained without change. After the calcining in step S4, the LiMPO$_4$ particles may lose some of the element M and gain some of the element N to form the LiM$_x$N$_{1-x}$PO$_4$ particles. The LiM$_x$N$_{1-x}$PO$_4$ particles may inherit the morphology, crystal structure, and size of the LiMPO$_4$ particles. On the other hand, the LiNPO$_4$ particles may lose some of the element N and gain some of the element M to form the LiM$_x$N$_{1-x}$PO$_4$ particles, and the LiM$_x$N$_{1-x}$PO$_4$ particles may inherit the morphology, crystal structure, and size of the LiNPO$_4$ particles. Therefore, the morphology and size of the LiM$_x$N$_{1-x}$PO$_4$ particles can be controlled by controlling the morphology and size of the LiMPO$_4$ particles and the LiNPO$_4$ particles. In one embodiment, the LiMPO$_4$ particles and the LiNPO$_4$ particles have the same morphology and size to form the LiM$_x$N$_{1-x}$PO$_4$ particles having uniform morphology and size to obtain a more superior capability of the cathode active material.

In step S3, a ratio of the LiMPO$_4$ particles to the LiNPO$_4$ particles are not limited and the value of x in the LiM$_x$N$_{1-x}$PO$_4$ particles can be determined by actual need. For example, if the value of x in the LiM$_x$N$_{1-x}$PO$_4$ particles is 4, a molar ratio of the LiMPO$_4$ particles to the LiNPO$_4$ particles can be set to 4:6. Any ratio of the LiMPO$_4$ particles to the LiNPO$_4$ particles can be used to obtain a high specific capacity in the cathode active material if the element N is one of Fe, Mn, Co, and Ni. If N is one of Mg, Ca, Zn, Cu, Al, B, Cr, Nb, Sc, Ti, V, Be, Sr, Ba, Zr, and La, the ratio of the LiMPO$_4$ particles to the LiNPO$_4$ particles can be set to have the value of x to be greater than 0.9 in the LiM$_x$N$_{1-x}$PO$_4$ particles, which have a relatively high specific capacity as the cathode active material.

The LiMPO$_4$ particles and the LiNPO$_4$ particles can be uniformly mixed to obtain the largest contact area therebetween in the precursor. The mixing is not limited except to avoid destroying the crystal structure and morphology of the LiMPO$_4$ particles and the LiNPO$_4$ particles. In one embodiment, the LiMPO$_4$ particles and the LiNPO$_4$ particles are mixed in a liquid medium by ultrasonic agitation. In another embodiment, the LiMPO$_4$ particles and the LiNPO$_4$ particles are nanosized which can be milled without destroying the crystal structure and the morphology.

Before the calcining step, the step S4 can further comprises a step of adding a carbon source to the precursor. The carbon source and the precursor are calcined together, during which the carbon source is decomposed to coat an elemental carbon layer on the surfaces of the LiMPO$_4$ particles and the LiNPO$_4$ particles. After the calcining, LiM$_x$N$_{1-x}$PO$_4$/C particles can be obtained. The elemental carbon layer can avoid an aggregation during the calcining between the LiMPO$_4$ particles and the LiNPO$_4$ particles, to avoid an aggregation of the formed LiM$_x$N$_{1-x}$PO$_4$ particles. In addition, the electrical conductivity of the LiM$_x$N$_{1-x}$PO$_4$ particles can be improved.

The carbon source can be cracked into elemental carbon during the calcining of step S4. The carbon source can be at least one of sucrose, glucose, Span 80, phenolic resin, epoxy resin, furan resin, polyacrylic acid, polyacrylonitrile, polyethylene glycol, and polyvinyl alcohol. The amount of the carbon source can be decided according actual needs. In one embodiment, the weight of the carbon source is 5% to 15% of a total weight of the LiMPO$_4$ particles and the LiNPO$_4$ particles.

The carbon source can be added to the precursor by various ways if only the precursor and the carbon source are mixed together. For example, in one embodiment, the carbon source can be added during the mixing of the LiMPO$_4$ particles and the LiNPO$_4$ particles. In another embodiment, the carbon source can be added to the precursor after the precursor is formed. In yet another embodiment, the precursor can be immersed in the carbon source to mix with the carbon source. The carbon source, the LiMPO$_4$ particles, and the LiNPO$_4$ particles can be uniformly mixed together and then calcined to form the carbon layer uniformly coated on the surfaces of the LiMPO$_4$ particles and the LiNPO$_4$ particles. In the present embodiment, the carbon source, the LiMPO$_4$ particles, and the LiNPO$_4$ particles are uniformly mixed with each other by a milling step.

In step S4, the calcining is processed at a temperature range from about 300° C. to about 1200° C. In one embodiment, the temperature range can be from about 500° C. to about 1000° C. The calcining can last for about 2 hours to about 20 hours. In one embodiment, the calcining can last for about 4 hours to about 10 hours. The calcining can be performed in an inert gas at a pressure of about 1 atm.

Example 1

0.016 mol of MnSO$_4$ and 0.048 mol of LiOH.H$_2$O are dissolved in 20 mL of a mixed solvent of ethylene glycol and deionized water (a volume ratio of the ethylene glycol and the deionized water is about 4:1). 0.016 mol of H$_3$PO$_4$ is added to this mixed solvent and mixed with the MnSO$_4$ and the LiOH to form a mixture. The mixture is solvothermal reacted at about 180° C. for about 12 hours to form nanosheet shaped LiMnPO$_4$ particles.

0.016 mol of FeSO$_4$ and 0.048 mol of LiOH.H$_2$O are dissolved in 20 mL of a mixed solvent of ethylene glycol and deionized water (a volume ratio of the ethylene glycol and the deionized water is about 4:1). 0.016 mol of H$_3$PO$_4$ is added to this mixed solvent and mixed with the FeSO$_4$ and the LiOH to form a mixture. The mixture is solvothermal reacted at about 180° C. for about 12 hours to form nanosheet shaped LiFePO$_4$ particles.

The nanosheet shaped LiMnPO$_4$ particles and the nanosheet shaped LiFePO$_4$ particles are mixed in a molar ratio of 4:6 and the mixture is milled for about 15 minutes to form the precursor. The precursor is calcined in a nitrogen gas environment at about 650° C. for about 5 hours to form LiMn$_{0.4}$Fe$_{0.6}$PO$_4$ particles.

Figure 2:
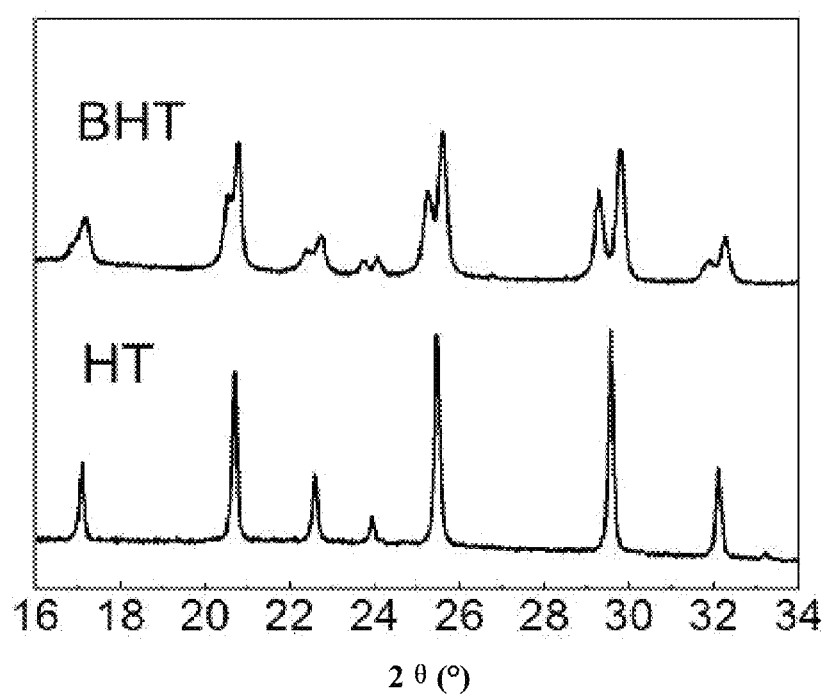
FIG. 2 shows X-ray diffraction (XRD) patterns of a precursor and $LiMn_{0.4}Fe_{0.6}PO_4$ particles in Example 1 before and after a calcining step.
Figure 3:
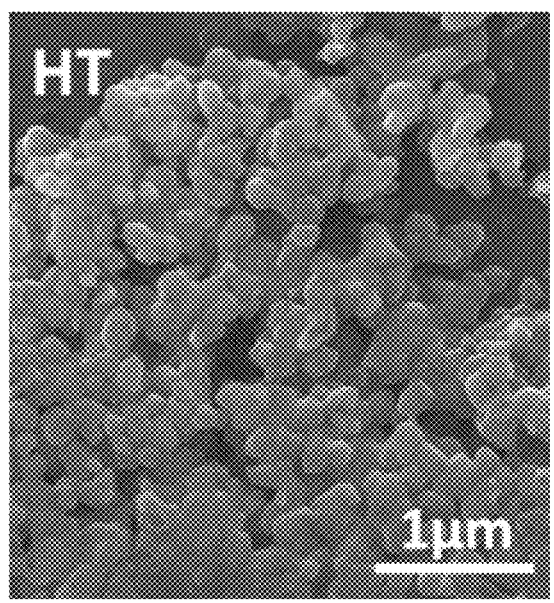
FIG. 3 is a scanning electron microscope (SEM) image of the $LiMn_{0.4}Fe_{0.6}PO_4$ particles in Example 1.

Referring to FIG. 2, by comparing the XRD patterns of the precursor before the calcining and the LiMn$_{0.4}$Fe$_{0.6}$PO$_4$ particles formed after the calcining, it can be seen that the diffraction peaks corresponding to LiMnPO$_4$ and LiFePO$_4$ disappear, and new diffraction peaks appear at a position between the original LiMnPO$_4$ and LiFePO$_4$ diffraction peaks. The new diffraction peaks have intensities that are stronger than the original $LiMnPO_4$ and $LiFePO_4$ diffraction peaks. The new diffraction peaks correspond to the $LiMn_{0.4}Fe_{0.6}PO_4$, which means that the $LiMnPO_4$ particles and the $LiFePO_4$ particles completely react with each other and form pure, well crystallized, olivine type $LiMn_{0.4}Fe_{0.6}PO_4$ particles. Referring to FIG. 3 and FIGS. 4A, 4B, 4I, and 4J, the morphology of the $LiMn_{0.4}Fe_{0.6}PO_4$ particles, which is the shape of nanosheet, is substantially the same with the morphology of the $LiMnPO_4$ particles and the $LiFePO_4$ particles. In addition, the size of the $LiMn_{0.4}Fe_{0.6}PO_4$ particles is also substantially the same with the size of the $LiMnPO_4$ particles and the $LiFePO_4$ particles.

Example 2

0.016 mol of $MnSO_4$ and 0.048 mol of $LiOH.H_2O$ are dissolved in 20 mL of a mixed solvent of ethylene glycol and deionized water (a volume ratio of the ethylene glycol and the deionized water is about 4:1). 0.016 mol of $H_3PO_4$ is added to this mixed solvent and mixed with the $MnSO_4$ and the LiOH to form a mixture. The mixture is solvothermal reacted at about 180° C. for about 12 hours to form nanosheet shaped $LiMnPO_4$ particles.

0.016 mol of $FeSO_4$ and 0.048 mol of $LiOH.H_2O$ are dissolved in 20 mL of a mixed solvent of ethylene glycol and deionized water (a volume ratio of the ethylene glycol and the deionized water is about 4:1). 0.016 mol of $H_3PO_4$ is added to this mixed solvent and mixed with the $FeSO_4$ and the LiOH to form a mixture. The mixture is solvothermal reacted at about 180° C. for about 12 hours to form nanosheet shaped $LiFePO_4$ particles.

The nanosheet shaped $LiMnPO_4$ particles, the nanosheet shaped $LiFePO_4$ particles, and sucrose are mixed and the mixture is milled for about 15 minutes to form the precursor. A molar ratio of the $LiMnPO_4$ particles to the $LiFePO_4$ particles is 2:8. A weight of sucrose is about 15% of a total weight of the $LiMnPO_4$ particles and the $LiFePO_4$ particles. The precursor is calcined in nitrogen gas environment at about 650° C. for about 5 hours to form $LiMn_{0.2}Fe_{0.8}PO_4/C$ particles.

The lithium ion battery is assembled by using the $LiMn_{0.2}Fe_{0.8}PO_4/C$ particles as the cathode active material. The cathode comprises 80 wt % of $LiMn_{0.4}Fe_{0.6}PO_4/C$ particles, 5 wt % of acetylene black, 5 wt % of conductive graphite, and 10 wt % of polyvinylidene fluoride. The anode is lithium metal. The separator is a Celgard 2400 polypropylene porous film. The electrolyte solution is 1 mol/L of $LiPF_6$ dissolved in a mixed solvent of ethylene carbonate (EC), Diethyl carbonate (DEC), and ethylmethyl carbonate (EMC) (3:1:1, v/v/v). The CR2032 button type lithium ion battery is assembled in an argon gas filled glove box, and rested in room temperature for a period of time before the electrochemical tests.

Example 3

Example 3 is substantially the same as Example 2, except that the molar ratio of the $LiMnPO_4$ particles to the $LiFePO_4$ particles is 4:6, and the $LiMn_{0.4}Fe_{0.6}PO_4/C$ particles are formed.

Comparative Example 1

Comparative Example 1 is substantially the same as Example 2, except that the $LiMn_{0.2}Fe_{0.8}PO_4$ particles are replaced by nanosheet shaped $LiFePO_4$ particles, and the $LiFePO_4/C$ particles are formed.

Comparative Example 2

Comparative Example 2 is substantially the same as Example 2, except that the $LiMn_{0.2}Fe_{0.8}PO_4$ particles are replaced by nanosheet shaped $LiMnPO_4$ particles, and the $LiMnPO_4/C$ particles are formed.

Figure 5:
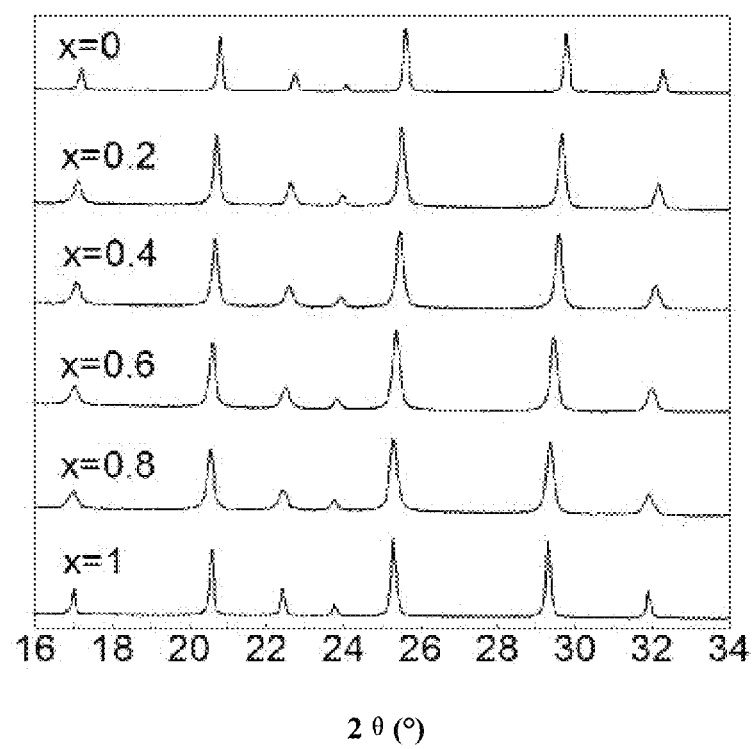
FIG. 5 shows XRD patterns of $LiMn_xFe_{1-x}PO_4/C$ particles in Example 1 (x=0), Example 2 (x=2), Example 3 (x=4), Example 4 (x=6), Example 5 (x=8), and Comparative Example 2 (x=1).
Figure 6:
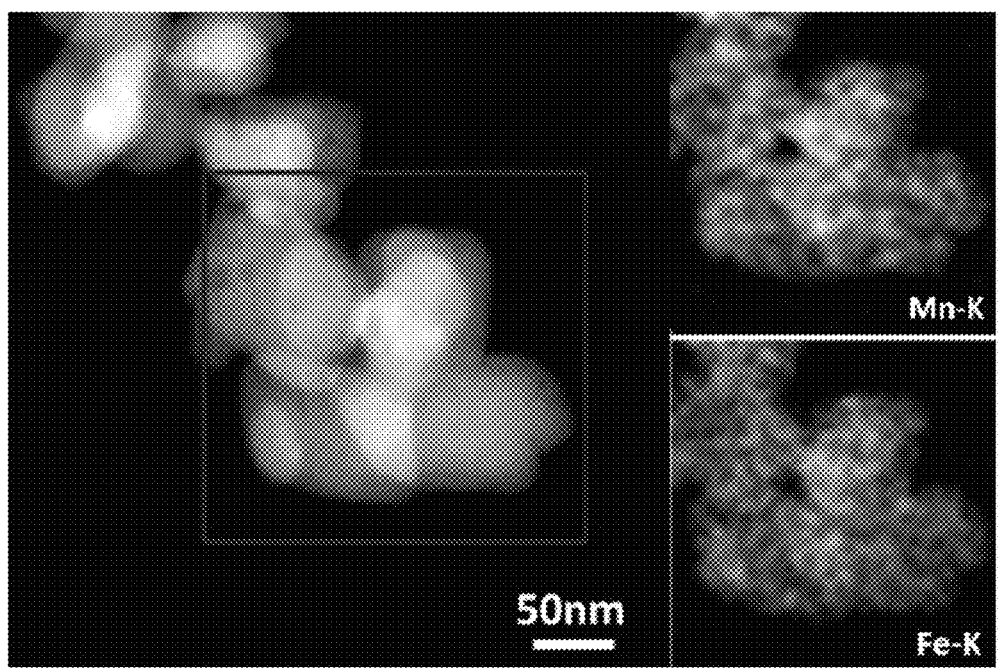
FIG. 6 shows element distributions of Fe and Mn in $LiMn_{0.4}Fe_{0.6}PO_4/C$ particles in Example 3.

Referring to FIG. 5, the $LiMnPO_4$ and $LiFePO_4$ diffraction peaks disappear, and new diffraction peaks corresponding to $LiMn_{0.4}Fe_{0.6}PO_4$ appear at a position between the original $LiMnPO_4$ and $LiFePO_4$ diffraction peaks, which means that in Example 3, the $LiMnPO_4$ particles and the $LiFePO_4$ particles completely react with each other and form the well crystallized $LiMn_{0.4}Fe_{0.6}PO_4$ particles. Referring to FIG. 4A to FIG. 4L, the morphology and size of the $LiMn_{0.4}Fe_{0.6}PO_4/C$ particles is substantially the same with the morphologies and sizes of the $LiMnPO_4$ particles and the $LiFePO_4$ particles. In addition, the $LiMn_{0.4}Fe_{0.6}PO_4/C$ particles, the $LiMnPO_4$ particles, and the $LiFePO_4$ particles have the same growth direction, which is along a bc plane of the crystal structure. There is no aggregation appeared in the $LiMn_{0.4}Fe_{0.6}PO_4/C$ particles. Referring to FIG. 6, the distribution of element Fe is in accord with the distribution of element Mn in the $LiMn_{0.4}Fe_{0.6}PO_4/C$ particles, which means that a thorough solid phase reaction occurs. Inductively coupled plasma atomic emission spectroscopy (ICP-AES) is applied to the $LiMn_{0.4}Fe_{0.6}PO_4/C$ particles, which reveals that a molar ratio of Mn to Fe in the $LiMn_{0.4}Fe_{0.6}PO_4/C$ particles is 4:5.983, which has a deviation smaller than 1% from the target stoichiometry. Therefore, the present method for making the $LiMn_{0.4}Fe_{0.6}PO_4/C$ particles can precisely control the stoichiometry of the reaction.

Example 4

Example 4 is substantially the same as Example 2, except that a molar ratio of the molar ratio of the $LiMnPO_4$ particles to the $LiFePO_4$ particles is 6:4, and the $LiMn_{0.6}Fe_{0.4}PO_4/C$ particles are formed.

Example 5

Example 5 is substantially the same as Example 2, except that a molar ratio of the $LiMnPO_4$ particles to the $LiFePO_4$ particles is 8:2, and the $LiMn_{0.8}Fe_{0.2}PO_4/C$ particles are formed.

Figure 7:
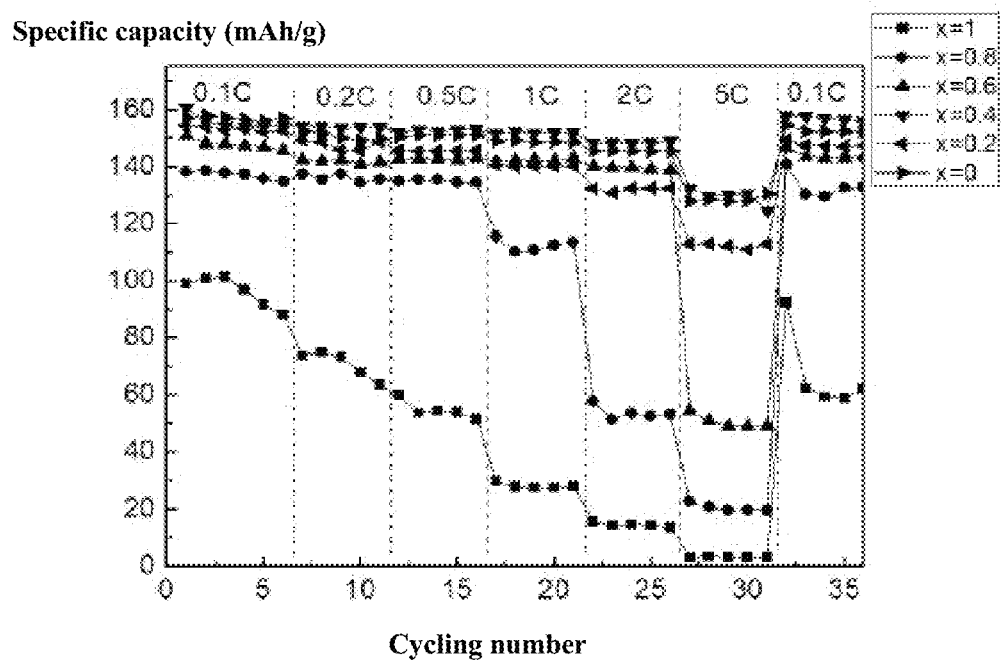
FIG. 7 is a graph showing discharge specific capacities at different current densities of $LiMn_xFe_{1-x}PO_4/C$ particles in Example 1 (x=0), Example 2 (x=2), Example 3 (x=4), Example 4 (x=6), Example 5 (x=8), and Comparative Example 2 (x=1) as the cathode active materials.
Figure 8:
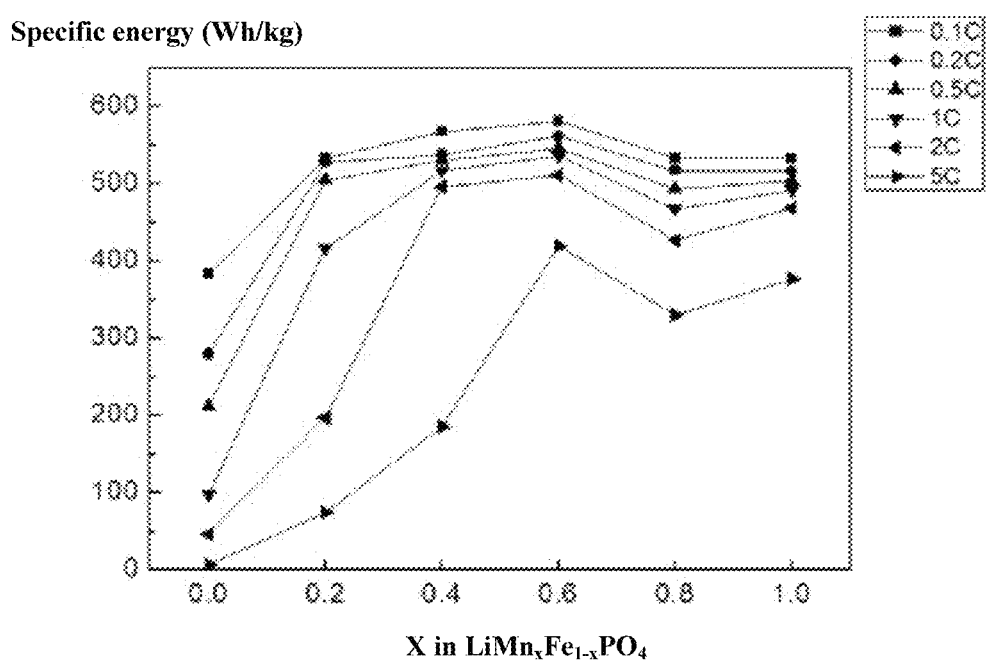
FIG. 8 is graph showing energy densities at different current densities of $LiMn_xFe_{1-x}PO_4/C$ particles in Example 1 (x=0), Example 2 (x=2), Example 3 (x=4), Example 4 (x=6), Example 5 (x=8), and Comparative Example 2 (x=1) as the cathode active materials.

Referring to FIG. 7 and FIG. 8, compared to the $LiFePO_4/C$ particles in Comparative Example 1 and $LiMnPO_4/C$ particles in Comparative Example 2, the $LiMn_xFe_{1-x}PO_4/C$ particles (x=0.2, 0.4, 0.6, and 0.8) in Examples 2 to 5 have superior cycling performances, rate capabilities, capacity retentions, and energy densities. Particularly, at a current rate of 0.1 C, a discharge specific capacity of the $LiMn_{0.4}Fe_{0.6}PO_4/C$ particles in Example 3 is about 160.6 mAh/g, and is 60% larger than the discharge specific capacity of the $LiMnPO_4/C$ particles. After times of cycling, the $LiMn_{0.4}Fe_{0.6}PO_4/C$ particles can still maintain a relatively high capacity. An energy density of the $LiMn_{0.4}Fe_{0.6}PO_4/C$ particles is 53% greater than the energy density of the $LiFePO_4/C$ particles. Therefore, the $LiMn_{0.4}Fe_{0.6}PO_4/C$ particles not only have a relatively high specific capacity but also have a relatively high energy density.

The present method can overcome problems existed in the conventional solid phase synthesis and the conventional solvothermal synthesis. The conventional solvothermal synthesis provides a complicated condition for the reaction, and different metal ions have their own crystallization behaviors. Therefore, by using the conventional solvothermal synthesis, the stoichiometry of the product is uncontrollable. The conventional solid phase synthesis adopts powders of ammonium dihydrogen phosphate as the phosphate source, lithium carbonate or lithium hydroxide as the lithium source, and ferrous oxalate/manganese (II) oxalate, ferrous acetate/manganese (II) acetate or manganese (II) carbonate as the iron/manganese source. During the high temperature calcining, elements Li, P, and O in the reactants are diffused and recrystallized, which generates defects in the crystal structure, and renders difficulty in morphology and particle size controlling, for the reason that the recrystallization is greatly affected by the temperature, interfacial properties, and crystal defects of the reactants.

The present method adopts the $LiMPO_4$ particles and the $LiNPO_4$ particles with the same crystal structure as the precursor to have a precise controlling of the stoichiometry in a solid phase reaction. For the reason that there is only a concentration difference of the M and N elements between the $LiMPO_4$ particles and the $LiNPO_4$ particles, during the calcining there is only a diffusion that occurs between elements M and N in the $LiMPO_4$ particles and the $LiNPO_4$ particles, and the morphology, crystal structure, and size of the formed $LiM_xN_{1-x}PO_4$ particles are inherited from the original $LiMPO_4$ particles and $LiNPO_4$ particles. Accordingly, the morphology and size of the $LiM_xN_{1-x}PO_4$ particles are capable of being controlled by controlling the morphology and size of the $LiMPO_4$ particles and the $LiNPO_4$ particles. The $LiM_xN_{1-x}PO_4$ particles formed by the present method as the cathode active material show superior cycling performances, rate capabilities, capacity retentions, and energy densities.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for making a cathode active material of a lithium ion battery, the method comprising:
   providing $LiMPO_4$ particles and $LiNPO_4$ particles both being olivine type crystals belonging to a pnma space group of an orthorhombic crystal system, wherein M represents Fe, Mn, Co, or Ni, N represents a metal element having a +2 valence, and N is different from M;
   mixing the $LiMPO_4$ particles and the $LiNPO_4$ particles together to form a precursor; and
   calcining the precursor to form $LiM_xN_{1-x}PO_4$ particles, wherein $0<x<1$.

2. The method of claim 1, wherein both the $LiMPO_4$ particles and the $LiNPO_4$ particles are nanosized particles.

3. The method of claim 1, wherein shapes of the $LiMPO_4$ particles and the $LiNPO_4$ particles are at least one of spheres, rods, and sheets.

4. The method of claim 1, wherein both the $LiMPO_4$ particles and the $LiNPO_4$ particles are sheet shaped.

5. The method of claim 1, wherein both the $LiMPO_4$ particles and the $LiNPO_4$ particles are nanosheets.

6. The method of claim 1, wherein the $LiMPO_4$ particles and the $LiNPO_4$ particles have a same morphology and a same size.

7. The method of claim 1, wherein both the $LiMPO_4$ particles and the $LiNPO_4$ particles are nanosheets with a same size.

8. The method of claim 1, wherein N is selected from the group consisting of Fe, Mn, Co, Ni, Mg, Ca, Zn, Cu, Al, B, Cr, Nb, Sc, Ti, V, Be, Sr, Ba, Zr, and La.

9. The method of claim 1, wherein N is selected from the group consisting of Mg, Ca, Zn, Cu, Al, B, Cr, Nb, Sc, Ti, V, Be, Sr, Ba, Zr, and La, and a ratio of the $LiMPO_4$ particles to the $LiNPO_4$ particles is set to have $x>0.9$.

10. The method of claim 1, wherein the $LiMPO_4$ particles and the $LiNPO_4$ particles are uniformly mixed to form the precursor.

11. The method of claim 1 further comprising a step of adding a carbon source into the precursor before calcining the precursor to form $LiM_xN_{1-x}PO_4$ particles.

12. The method of claim 1, wherein a weight of the carbon source is 5% to 15% of a total weight of the $LiMPO_4$ particles and the $LiNPO_4$ particles.

13. The method of claim 1, wherein the carbon source is selected from the group consisting of sucrose, glucose, Span 80, phenolic resin, epoxy resin, furan resin, polyacrylic acid, polyacrylonitrile, polyethylene glycol, polyvinyl alcohol, and combinations thereof.

14. The method of claim 1, wherein the calcining occurs at a temperature range from about 300° C. to about 1200° C.

15. The method of claim 14, wherein the temperature range is from about 500° C. to about 1000° C.

16. The method of claim 1, wherein the calcining is processed in an inert gas.

* * * * *